Feb. 29, 1944.    A. J. PENICK    2,343,156

ROASTER

Filed March 3, 1943

Inventor
Arthur J. Penick
E. V. Hardway
Attorney

Patented Feb. 29, 1944

2,343,156

UNITED STATES PATENT OFFICE 2,343,156

ROASTER

Arthur J. Penick, Houston, Tex.

Application March 3, 1943, Serial No. 477,898

3 Claims. (Cl. 99—346)

This invention relates to a roaster.

An object of the invention is to provide a cooking utensil specially designed for the purpose of cooking meats whereby the article being cooked may be basted from time to time with the meat juices without removing the cover and permitting a partial cooling of the meat being cooked.

In the process of cooking meats it is desirable to keep the same constantly covered so as to preserve a uniform temperature; it is also desirable from time to time to baste the meat, that is, to distribute the meat juices thereover. It is the prime object of the present invention to provide a cooking utensil whereby the basting process may be carried on without reducing the temperature within the utensil.

It is another object of the invention to provide a utensil of the character described which is composed essentially of only two parts, to-wit, the pan, or container, and the cover therefor, said parts embodying the self-basting tubes and nozzles for basting the article being cooked.

With the above and other objects in view the invention has particular relation to certain novel features of construction, operation and arrangement of parts, an example of which is given in this specification and illustrated in the accompanying drawing, wherein.

Figure 2:
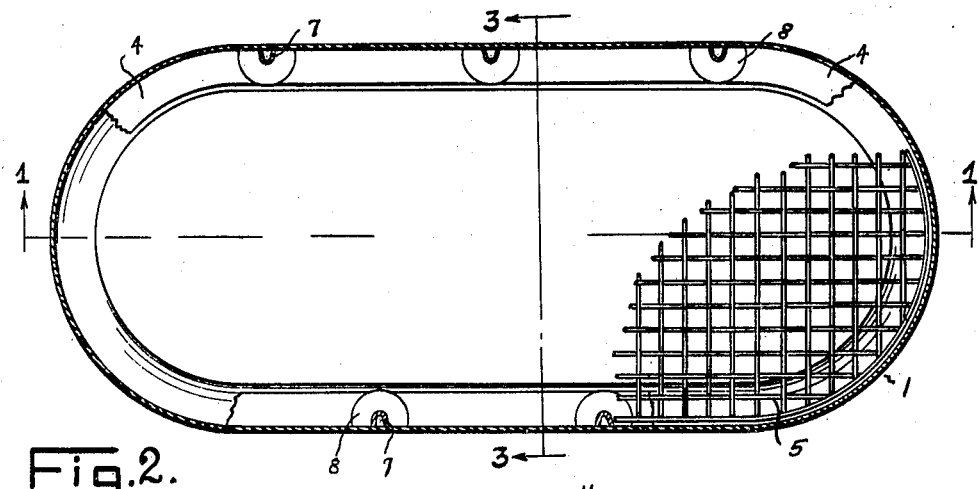
Figure 2 shows a horizontal sectional view taken on the line 2—2 of Figure 1 and partly broken away.

Referring now more particularly to the drawing wherein like numerals of reference designate the same parts in each of the figures, the numeral 1 designates the pan or container which may be of any selected shape. As shown the central portion 2 of the bottom of the pan is elevated thus providing a trough or groove 3 all the way around said elevated portion.

Anchored to the wall of the pan 1 and declining inwardly over the groove 3 there is an apron 4.

The numeral 5 designates a foraminated grill for supporting the meat or other article to be cooked and which is supported above the bottom by means of the legs 6, 6.

Secured to the sides of the container, on the inside are the vertical channels 7 which are, preferably, welded to said sides and whose upper ends are substantially flush with the upper margin of the container. The lower ends of these channels are flared downwardly forming inverted funnels 8 over the groove 3 and which may be formed as a unit with the apron, or hood 4.

Figure 1:
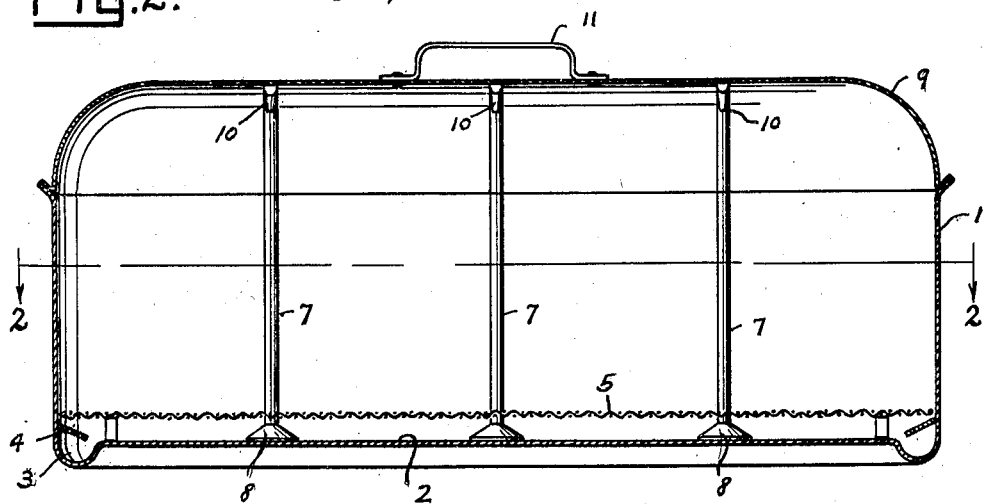
Figure 1 shows a vertical sectional view taken on the line 1—1 of Figure 2.
Figure 3:
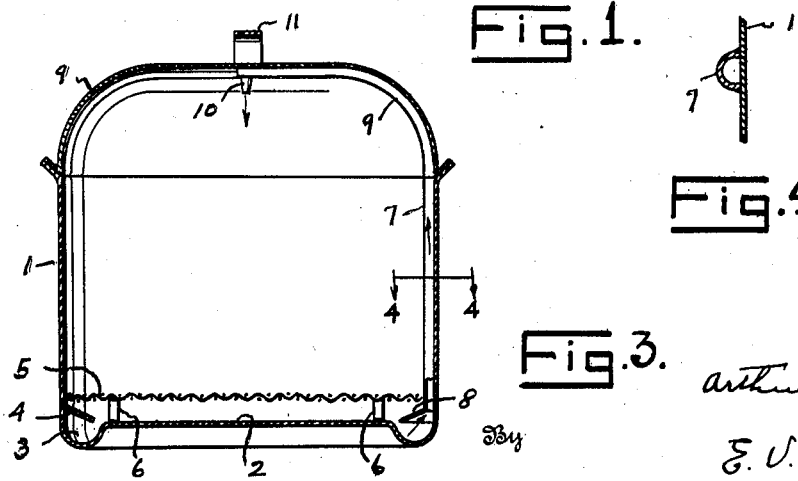
Figure 3 shows a vertical sectional view taken on the line 3—3 of Figure 2.

There is a cover 9 which is fitted onto the container. The abutting margins of the container and cover are beveled as shown in Figures 1 and 3 to form a close fitting joint.

The channels on opposite sides of the container are staggered as shown in Figure 2.

Figure 4:
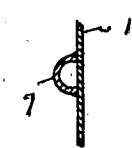
Figure 4 shows a fragmentary transverse sectional view taken on the line 4—4 of Figure 3.

The cover is provided with channel shaped nozzle pipes 9 which are welded to the underside thereof in the same manner as the channel 7 as shown in Figure 4 and these pipes 9 extend to the middle of the cover and terminate in the downwardly directed nozzles 10. The nozzle pipes 9 are arranged so that their lower ends will match with the upper ends of the corresponding channels 7 and form close fitting joints therewith.

The cover is formed with a grip 11 whereby it may be readily handled.

During the cooking process the juices will accumulate in the groove or trough 3.

The pressure generated by the heat will force at least a part of the juices up through the channels 7 and 9 and out through the nozzles 10 onto the article of food being cooked so that the same will be properly basted during the cooking process.

The apron 4 is not indispensable, as the funnels 8 may be made sufficiently large to accomplish the desired purpose without using the apron 4.

By the use of this utensil the meat may be thoroughly cooked and basted as desired and the temperature within the utensil retained at the required temperature.

The utensil is of very simple construction, being composed essentially of two parts, to-wit, the container and the cover.

The drawing and description are illustrative merely while the broad principle of the invention will be defined by the appended claims.

What I claim is:

1. A cooking utensil comprising a container having a trough-like groove around the bottom thereof, tubular channels on the container walls leading upwardly from said groove, and whose lower ends are spaced above the groove and flared downwardly, a cover for the container, nozzle pipes on the cover arranged so that their lower ends will match the upper ends of the channels when the cover is on the container and whose other ends terminate in downwardly directed nozzles.

2. A cooking utensil comprising a container having a trough-like groove around the bottom thereof, tubular channels formed integrally with the walls of the container and extending upwardly from the groove and whose lower ends are spaced over the groove and flared, a cover for the container, nozzle pipes formed integrally with the cover whose lower ends are arranged to match, and form seals with the upper ends of the channels when the cover is on the container and whose other ends terminate in downwardly directed nozzles.

3. A cooking utensil comprising a container having a trough-like groove around the bottom thereof, tubular channels on the container walls leading upwardly from said groove, a cover for the container, nozzle pipes on the cover arranged so that their lower ends will match the upper ends of the channels when the cover is on the container and whose other ends terminate in downwardly directed nozzles and an apron secured to the wall of the container and overhanging the groove all the way around the container.

ARTHUR J. PENICK.